United States Patent
Guy et al.

(10) Patent No.: US 11,194,034 B2
(45) Date of Patent: Dec. 7, 2021

(54) SYSTEM AND METHOD FOR DETERMINING A GEOGRAPHIC LOCATION OF PIXELS IN A SCAN RECEIVED FROM A REMOTE SENSOR

(71) Applicant: Utilis Israel Ltd., Kfar-Saba (IL)

(72) Inventors: Lauren Guy, Beer-Sheva (IL); Yael Freankel, Haifa (IL); Yuval Lorig, Nahariyya (IL)

(73) Assignee: Utilis Israel Ltd., Kfar-Saba (IL)

( * ) Notice: Subject to any disclaimer, the term of this patent is extended or adjusted under 35 U.S.C. 154(b) by 368 days.

(21) Appl. No.: 16/294,941

(22) Filed: Mar. 7, 2019

(65) Prior Publication Data

US 2020/0284894 A1 Sep. 10, 2020

(51) Int. Cl.
*G01S 13/42* (2006.01)
*G01N 21/3563* (2014.01)
*G01S 13/90* (2006.01)

(52) U.S. Cl.
CPC ........ *G01S 13/426* (2013.01); *G01N 21/3563* (2013.01); *G01S 13/9011* (2013.01)

(58) Field of Classification Search
CPC .... G01S 13/426; G01S 13/9011; G01S 7/412; G01S 7/4026; G01S 13/9021; G01N 21/3563
USPC .......................................................... 342/70
See application file for complete search history.

(56) References Cited

U.S. PATENT DOCUMENTS

| 2004/0146183 A1* | 7/2004 | Shimoni | G06T 7/248 382/103 |
| 2007/0014488 A1* | 1/2007 | Chen | G06T 7/33 382/294 |
| 2008/0063270 A1* | 3/2008 | McClelland | G01S 19/51 382/170 |
| 2011/0064263 A1* | 3/2011 | de Haan | G06K 9/00979 382/100 |
| 2011/0064312 A1* | 3/2011 | Janky | G06K 9/00 382/195 |

(Continued)

OTHER PUBLICATIONS

International Search Report of PCT Application No. PCT/IL2020/050260, dated Jul. 2, 2020.

*Primary Examiner* — Vladimir Magloire
*Assistant Examiner* — Alexander L. Syrkin
(74) *Attorney, Agent, or Firm* — The Roy Gross Law Firm, LLC; Roy Gross (57) ABSTRACT

Embodiments include a system and a method for determining a geographic location corresponding to pixels in a scan. For a scan of an area including a plurality of pixels, measurements of at least one physical property may be received. An embodiment may include identifying in the scan at least a first pixel and a second pixel corresponding to known at least a first and a second geographical locations; creating a set of pixel values vectors, for each pixel values vector calculating a correlation factor between the pixel values vector and a vector that includes the measurements; selecting a pixel values vector, from the set of pixel values vectors, for which a correlation factor higher than a threshold value was calculated; and determining the actual geographic location of the area represented by each pixel in the selected pixel values vector based on the known geographic locations.

10 Claims, 5 Drawing Sheets

(56) References Cited

U.S. PATENT DOCUMENTS

2012/0257792 A1\* 10/2012 Simon ................... G01S 17/89
                                                    382/103
2014/0254317 A1\* 9/2014 Thompson ............... G01V 1/36
                                                    367/21

\* cited by examiner

| Pixel no / vector | A1 | A2 | A3 | A4 | A5 | A6 | A7 | A8 | A9 | A10 |
|---|---|---|---|---|---|---|---|---|---|---|
| V1 | -4 | -68 | 2 | -15 | -41 | -83 | -11 | -2 | -49 | -76 |
| V2 | -38 | 11 | -81 | -80 | -46 | -3 | -77 | -59 | -3 | -78 |
| V3 | -72 | 9 | -1 | -57 | -9 | -20 | -34 | -5 | -27 | -32 |
| V4 | 5 | -36 | 7 | -79 | -6 | -69 | -6 | -60 | 13 | -8 |
| V5 | -22 | -6 | -18 | -73 | -65 | -72 | 3 | 7 | 5 | 4 |
| V6 | -74 | -70 | -10 | -69 | 12 | -35 | 10 | -50 | -56 | -71 |
| V7 | -55 | -43 | 11 | -16 | -40 | -45 | -30 | -64 | -1 | -28 |

FIG. 4A

| Pixel no / vector | A1 | A2 | A3 | A4 | A5 | A6 | A7 | A8 | A9 | A10 |
|---|---|---|---|---|---|---|---|---|---|---|
| V1 | -1.15 / 52.35 | -1.15 / 52.35 | -1.15 / 52.35 | -1.15 / 52.35 | -1.15 / 52.35 | -1.15 / 52.35 | -1.14 / 52.35 | -1.14 / 52.35 | -1.17 / 52.36 | -1.15 / 52.35 |
| V2 | -1.15 / 52.35 | -1.15 / 52.35 | -1.15 / 52.35 | -1.15 / 52.35 | -1.15 / 52.35 | -1.15 / 52.35 | -1.14 / 52.35 | -1.14 / 52.35 | -1.17 / 52.36 | -1.15 / 52.35 |
| V3 | -1.15 / 52.35 | -1.15 / 52.35 | -1.15 / 52.35 | -1.15 / 52.35 | -1.15 / 52.35 | -1.15 / 52.35 | -1.14 / 52.35 | -1.14 / 52.35 | -1.17 / 52.36 | -1.15 / 52.35 |
| V4 | -1.15 / 52.35 | -1.15 / 52.35 | -1.15 / 52.35 | -1.15 / 52.35 | -1.15 / 52.35 | -1.15 / 52.35 | -1.14 / 52.35 | -1.14 / 52.35 | -1.17 / 52.36 | -1.15 / 52.35 |
| V5 | -1.15 / 52.35 | -1.15 / 52.35 | -1.15 / 52.35 | -1.15 / 52.35 | -1.15 / 52.35 | -1.15 / 52.35 | -1.14 / 52.35 | -1.14 / 52.35 | -1.17 / 52.36 | -1.15 / 52.35 |
| V6 | -1.15 / 52.35 | -1.15 / 52.35 | -1.15 / 52.35 | -1.15 / 52.35 | -1.15 / 52.35 | -1.15 / 52.35 | -1.14 / 52.35 | -1.14 / 52.35 | -1.17 / 52.36 | -1.15 / 52.35 |
| V7 | -1.15 / 52.35 | -1.15 / 52.35 | -1.15 / 52.35 | -1.15 / 52.35 | -1.15 / 52.35 | -1.15 / 52.35 | -1.14 / 52.35 | -1.14 / 52.35 | -1.17 / 52.36 | -1.15 / 52.35 |

FIG. 4B

Replacement Sheet

FIG. 5

SYSTEM AND METHOD FOR DETERMINING A GEOGRAPHIC LOCATION OF PIXELS IN A SCAN RECEIVED FROM A REMOTE SENSOR

FIELD OF THE INVENTION

The present invention relates generally to remote sensing of physical properties. More specifically, the present invention relates to systems and methods of determining a geographic location of pixels in a scan received from a remote sensor, for accurately conducting remote sensing of physical properties.

BACKGROUND OF THE INVENTION

Remote sensing of physical properties, such as ground temperature, soil moisture, soil salinity, soil contamination and the like, is an effective time saving method for conducting surveys of large areas. The remote sensing may be conducted by scanning the area using a remote sensor for sensing reflected electromagnetic (EM) radiation in various wavelengths. For example, an infrared (IR) based camera may be used for remote sensing of temperature, radiofrequency (RF) based radar (e.g., a Synthetic Aperture Radar (SAR)) may be used for remote sensing of soil moisture and soil salinity, and aerial photography in the visible light can be used for detecting soil/open water contamination.

Each scan or image may include a plurality of pixels each defined by its geographical location in the area (e.g., in geographic coordinates) and including the intensity level of the reflected radiation (e.g., IR or RF) reflected from the geographical location. The intensity levels are sometimes presented as greyscale levels (or other colors).

The major drawback of these methods is the unknown spatial distortions included in any EM scanning of an area. Such spatial distortions may originate from EM phenomena such as layover, shadowing, foreshortening and the like. In all remote sensing systems, the viewing geometry of a radar/camera results in certain geometric distortions on the resultant scanning and imagery.

Therefore, an additional step of georeferencing is required in order to correctly correlate each pixel in the scan with a correct geographical location. However, since the spatial distortions are unknown and uneven at different locations in the scan it is impossible to conduct a single correction step in order to correct the locations of all the pixels in the scan. For example, in an RF reflections scan received from an SAR the real geographical locations from which the RF reflections were received can be between several meters to several hundreds of meters away from the location indicated in the scan.

Accordingly, in order to increase the accuracy of remote sensing there is a need for a method and a system for determining the real geographic locations of pixels in a scan received from a remote sensor. Such a correlation may allow to re-calibrate the intensity levels associated with a physical property and to use the re-calibrated intensity levels in forming of accurate maps from a received scan.

SUMMARY OF THE INVENTION

Embodiments of the invention include a system and a method for determining a geographic location corresponding to pixels in a scan. In some embodiments, the system may include a memory and a processor configured to execute instructions stored in the memory. In some embodiments, the instructions may include a embodiments that include: for a scan of an area including a plurality of pixels, each pixel including a pixel value indicative of an electromagnetic (EM) reflection, receiving, for known geographical locations, measurements of at least one physical property; identifying in the scan at least a first pixel and a second pixel with assumed geographical locations corresponding to known at least a first and a second geographical locations; creating a set of pixel values vectors, wherein each pixel values vector comprises a set of pixel values, and each pixel value is from a neighboring pixel of at least the first pixel and the second pixel; for each pixel values vector calculating a correlation factor between the pixel values vector and a vector that includes the measurements; selecting a pixel values vector, from the set of pixel values vectors, for which a correlation factor higher than a threshold value was calculated; and determining the actual geographic location of the area represented by each pixel in the selected pixel values vector based on the known geographic locations.

In some embodiments, the measurement of the at least one physical property may be received from at least one of: a sensor measuring the physical property at each geographical location and a sample taken from each geographical location to be analyzed in a laboratory. In some embodiments, the at least one physical property may be selected from a group consisting of: a level of humidity in the ground at each geographical location, a temperature of the ground at each geographical location, a temperature of the air above the ground at each geographical location, a level of contaminating material in the ground at each geographical location and a level of soil salinity at each geographical location.

In some embodiments, the remote sensor may be attached to an object located at least 50 meters above the area. In some embodiments, the sensor may be selected from a group consisting of: a sensor for detecting radio frequency radiation reflections and an infrared camera. In some embodiments, the pixel values received from the scan may be grey levels, and the embodiments may further include converting the pixel values from grey levels to intensity levels.

Some embodiments may further include filtering noise from the scan. Some embodiments may further include receiving data related to land cover; and filtering the noise from the scan using the data related to land cover. Some embodiments may further include associating each pixel value form the selected the pixel values vector with the corresponding physical property measurement, and creating an equation associating pixel values with physical property values based on the association.

Some embodiments may further include receiving from the remote sensor an additional scan from an area; and determining the physical property values at each pixel in the additional scan based on the created equation.

In some embodiments, method instructions stored in the memory may include: for a scan of an area comprising a plurality of pixels, each pixel including a pixel value indicative of an electromagnetic (EM) reflection; receiving, for known geographical coordinates in the area, measurements of at least one physical property; determining in the scan at least a first pixel and a second pixel with assumed geographical coordinates similar to the received known geographical coordinates; creating a set of pixel values sets, wherein each pixel values set comprises a set of pixel values, and each pixel value is from a neighboring pixel of at least the first pixel and the second pixel; for each pixel values set calculating comparison between the pixel values set a set that includes the measurements; identifying a pixel values set, from the set of pixel values sets, for which a comparison parameter higher than a threshold value was calculated; and determining the actual geographic coordinates of the area represented by each pixel in the selected pixel values set based on the known geographic coordinates.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing." "calculating," "determining," "establishing", "analyzing". "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other non-transitory processor-readable storage medium that may store instructions, which when executed by the processor, cause the processor to perform operations and/or processes as discussed herein. The terms "plurality" or "a plurality" may be used throughout the specification to describe two or more components, devices, elements, units, parameters, or the like. The term "set" when used herein may include one or more items. Unless explicitly stated, the method embodiments described herein are not constrained to a particular order or sequence of steps. Additionally, some of the described method embodiments, or elements thereof, may occur or be performed simultaneously, at the same point in time, or concurrently.

Embodiments of the invention are related to a method and a system for determining a geographic location of regions represented by pixels in a scan or image received from a remote sensor. A scan may be for example, an image, or a file that includes a plurality of pixels, where each pixel is associated with a location in the scan and a numerical value (e.g., the pixel value).

A method according to embodiments of the invention may correct the spatial/geometrical distortions included in the scan, thus allowing for correct correlation between the location of a pixel in the scan and its geographical coordinates in the real world. An embodiment may use measurements coordinates of physical properties taken from known geographical locations (e.g., known geographical coordinates) and comparing them with values associated with pixels in the scan.

As used herein, a "physical property" may be any measurable property that may be taken from/at a geographical location in an area. Some examples for physical properties may include for example, soil moisture, soil salinity, soil contamination (the amount of contaminated material in soil), ground temperature, temperature at a fixed height above the ground and the like. Other properties may be used.

As used herein, a "remote sensor" may include any sensor, radar detector, camera and the like that is configured to detect EM radiation reflected from an area which is, at the time of scan, remote from the sensor. In some embodiments, the remote sensor may be located some distance from the area as to avoid any physical contact between the area and the sensor. The remote sensor may be located or attached to an object located at least 50 meter above the area, for example, an airplane, a satellite, a tower, a tall building, and the like. The EM radiation may include for example low-medium frequency (or long wavelength) EM waves, for example, in IR radiation, RF radiation and the like. EM radiation in the IR range may include EM radiation at a wavelength of 700-1050 nanometers (300 GHz-430 THz). EM radiation in the RF range may include EM radiation at a wavelength of 0.1 mm-100,000 Km (3 THz-3 Hz). The RF range may include several frequency bands, for example, P band (250-1000 MHz) L band (1000-3000 MHz). S band (2-4 GHz), C band (4-8 GHz), X band (8-12 GHz) and the like.

As used herein, a "scan" or image may include information (e.g., a file) received from the remote sensor that includes a plurality of pixels each associated with or linked to an assumed geographic location and a "pixel value" representing the EM reflection from a location in an area, e.g. a geographic or land area, or a section of land. In some embodiments, the "pixel value" may be at least one of: the intensity of the reflected EM radiation, the wavelength of the reflected EM radiation and a phase information of the reflected EM radiation. In some embodiments, the intensity may be provided in greyscale (or any other color scale) and can be visually presented as a map. In some embodiments, the phase information may include one of two values, the real in-phase component and the imaginary quadrature component of the EM reflected wave.

A method according to embodiments of the invention may rely on a known correlation between a measured physical property and the influence such physical property has on the EM reflections. For example, the amount of humidity (e.g., water) and/or salinity in the soil may influence the intensity of RF radiation reflected from the soil. In another example, the temperature of the surface may influence the IR radiation reflections from the surface.

Accordingly, the same correlation or comparison may be received between pixel values of pixels in the scan associated with specific locations from which the measurements of a physical property were taken and the corresponding measured physical property. Therefore, a method according to embodiments of the invention may identify these pixels from a plurality of neighboring pixels located in proximity to the pixel assumed to be associated with or representing each specific location.

In some embodiments, the known correlation may be a linear correlation or any other known mathematical correlation, for example, a polynomial correlation. In some embodiments, finding the correlation may result in finding a mathematical equation. In some embodiments, the mathematical equation may be used for correcting any new scan received from the same remote sensor, such that the corrected new scan may include more accurate pixel values at each geographic location that may be converted into a map presenting the physical property, for example, a map presenting soil moisture levels at various location in the area, a map presenting temperatures at various location in the area and the like.

Figure 1:
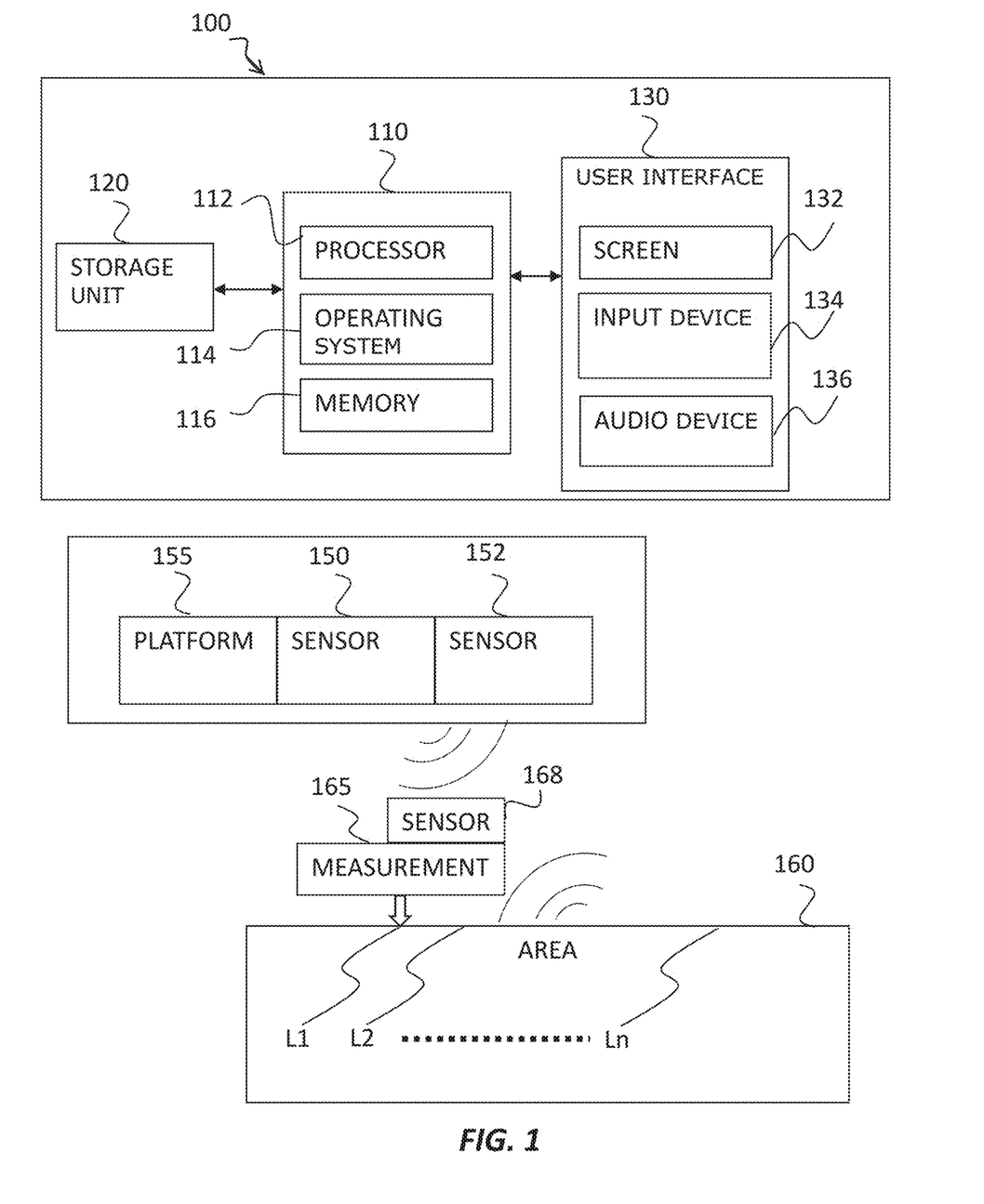
FIG. 1 is high level block diagram of a system for determining a geographic location of pixels in a scan received from a remote sensor according to some embodiments of the invention.

Reference is now made to FIG. 1 which is a high-level block diagram of a system for determining a geographic location of pixels in a scan received from a remote sensor according to some embodiments of the invention. A system 100 may include a computer processing device 110, a storage unit 120 and a user interface 130. System 100) may receive from a remote sensor 150 scans that may include EM reflections from an area 160. In some embodiments, remote sensor 150 may be located remotely from the area as to avoid ant physical contact of sensor 150 with the area. Processing unit 110 may include a processor 112 that may be, for example, a central processing unit (CPU), a chip or any suitable computing or computational device, an operating system 114 and a memory 116. System 100 may be included in a desktop computer, laptop computer, a tablet, a mainframe computer or the like. Processor 112 or other processors may be configured to carry out methods according to embodiments of the present invention by for example executing instructions stored in a memory such as memory 116. In some embodiments, system 100 may receive from a second sensor 152 scans having EM reflections area 160. In some embodiments, sensor 152 may be identical to or may be different from sensor 150.

Operating system 114 may be or may include any code segment designed and/or configured to perform tasks involving coordination, scheduling, arbitrating, supervising, controlling or otherwise managing operation of processing device 110, for example, scheduling execution of programs. Operating system 114 may be a commercial operating system. Memory 116 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 116 may be or may include a plurality of, possibly different memory units.

Memory 116 may store any executable code, e.g., an application, a program, a process, operations, task or script. The executable code may when executed by a processor cause the processor to determine a geographic location of pixels in a scan received from a remote sensor and perform methods according to embodiments of the present invention. The executable code may be executed by processor 112 possibly under control of operating system 114. Memory 116 may store data such as for example images, gray scale or intensity levels, scans, reflections, etc.

Storage 120 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 120 and may be loaded from storage 120 into memory 116 where it may be processed by processor 112. For example, storage 120 may include scans previously received from remote sensor 150 and/or 152, geographical data related to the scanned area (e.g., topographical maps, road maps, etc.) and the like.

User interface 130 may be, be displayed on, or may include a screen 132 (e.g., a monitor, a display, a CRT, etc.), an input device 134 and an audio device 136. Input device 134 may be a keyboard, a mouse, a touch screen or a pad or any other suitable device that allows a user to communicate with processor 112. Screen 132 may be any screen suitable for displaying maps and/or scans according to embodiments of the invention. In some embodiments, screen 132 and input device 134 may be included in a single device, for example, a touch screen. It will be recognized that any suitable number of input devices may be included in user interface 130. User interface 130 may include audio device 136 such as one or more speakers, earphones and/or any other suitable audio devices. It will be recognized that any suitable number of output devices may be included in user interface 130. Any applicable input/output (I/O) devices may be connected to processing unit 110. For example, a wired or wireless network interface card (NIC), a modem, printer or facsimile machine, a universal serial bus (USB) device or external hard drive may be included in user interface 130.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage unit.

A system 100 may include or may be, for example, a personal computer, a desktop computer, a mobile computer, a laptop computer, a notebook computer, a terminal, a workstation, a server computer, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Sensor 150 and/or sensor 152 may include any sensor, radar, camera and the like that is configured to detect EM radiation reflected from an area, as defined herein above. For example, sensor 150 may include a receiver for a radar or Synthetic-Aperture radar (SAR) SAR. In another example, sensor 150 and/or 152 may be an IR camera. Sensors 150 and/or 152 may be placed, for example, on an elevated platform or structure 155. Elevated platform or structure 155, may be for example, a satellite, an aircraft or an air balloon, a high building, etc. and may be located at least 50 meters above the ground (i.e., at height of at least 50 m above the ground), or another distance above the ground, for example, 70 meters, 100 meters, 150 meters, 500 meters, 1000 meters or more. In some embodiments, sensor 152 may have different detection resolution (e.g., higher resolution) than sensor 150. In some embodiments, sensor 152 may be configured to detect EM reflections at a different wavelength from sensor 150, for example, sensor 150 may be a SAR and sensor 152 may be aerial photography camera.

In some embodiments, measurements 165 from a plurality of geographical locations L1, L2 . . . Ln (wherein n is an integer) in area 160 may be taken, for example, by a sensor 168 measuring the property at locations L1, L2 . . . Ln or by taking a sample from locations L1, L2 . . . Ln to a laboratory, as will be discussed with respect to FIG. 2.

Figure 2:
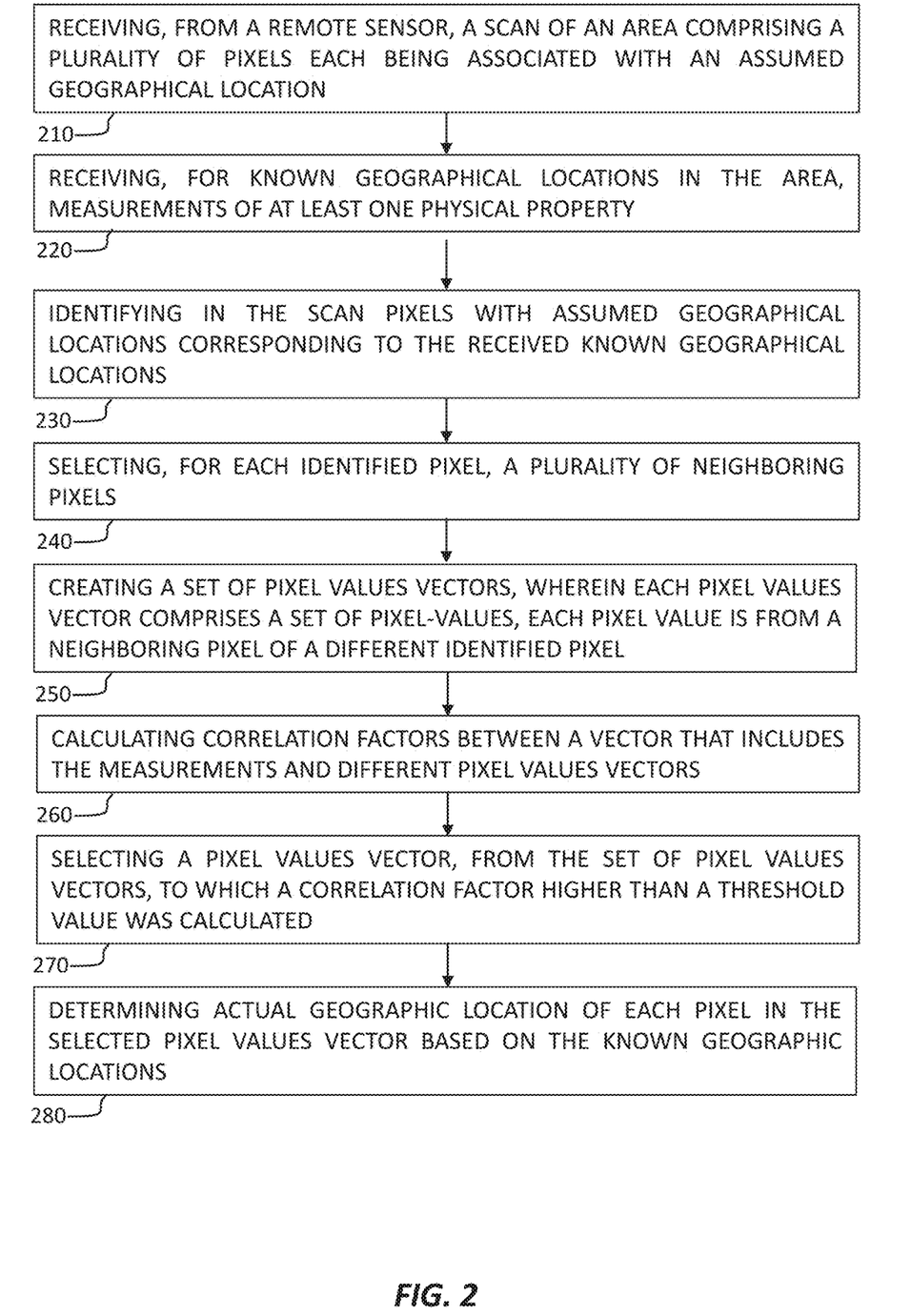
FIG. 2 is a flowchart of a method of determining a geographic location of pixels in a scan received from a remote sensor according to some embodiments of the invention.

Reference is made to FIG. 2, which is a flowchart of a method of determining a geographic location (e.g., coordinates) corresponding to pixels in a scan according to some embodiments of the invention. Embodiments of the method of FIG. 2 may be performed for example by system 100 or by another system. In step 210, a scan of an area may be received from a remote sensor. The scan may include a plurality of pixels each including a pixel value indicative of EM reflection. In some embodiments, each pixel may have a location in the scan that may correspond to an assumed geographical location (e.g., coordinates). For example, associating a location of a pixel in the scan with an assumed geographic location may include receiving a geographical map and/or an aerial photograph having known geographical coordinates for the area. A portion of the map/aerial photograph that may have the same boundaries as the scan may be divided into pixels having the same dimensions as the pixels in the scan (e.g., 3×3 meters). In some embodiments, geographic coordinates for each divided pixel may be determined, for example, at the center of the pixel). Each pixel in the scan may be associated with geographic coordinates of the corresponding divided pixel (originated from the map/aerial photograph). In some embodiments, the assumed geographical location may include geographical coordinates, for example, GPS coordinates. In some embodiments, the scan may be received from remote sensor 150 and/or 152 and may include EM reflections in at least one of: the IR range, the RF range and the like.

In some embodiments, two scans may be received in the same range (e.g., the RF range) having different polarizations. In some embodiments, the size of each pixel in the scan may depend on the resolution of the sensor (e.g., sensor 150 or 152) located at least 50 meters above the ground and may represent a portion of the area. For example, a pixel may represent reflections received from 2 m, 3 m, 6 m$^2$, 12 m$^2$, or the like. In some embodiments, RF based radars, such as, SAR may receive reflection from both above ground and underground, therefore each pixel may include reflection reflected from both above and underground objects.

In some embodiments, a pixel value indicative of EM reflection may include any value that may present at least one property of the reflected EM radiation, for example, the intensity of the reflection, the wavelength of the reflection, the frequency of the reflection, phase of the reflection and the like. For example, if a scan or image includes reflections from radiation at a single frequency (or narrow band of frequencies), a processor associated with the sensor may convert or translate the intensities of the reflections into data including pixels having different gray-levels (e.g., pixel values), such that, each grey level is indicative of the reflection intensity. This data may be received and analyzed by system 100. The gray scale level of each pixel converted from EM reflection of the scan may be related to a reflection intensity level received from a single area unit (e.g., 3 m$^2$) at a respective depth (e.g., 3 m). Both the reflection intensity level and the grey level are given as examples for pixel value indicative of EM reflection only, and the invention as a whole is not limited to these specific examples. In other examples, each pixel value may include a wavelength and/or the phase of the EM wave.

Some embodiments may include converting the reflections from gray scale levels to backscattered intensity levels. As used herein gray scale levels may be defined according to the ratio between black color or level and white color or level at each pixel. The gray levels may be converted or correlated to EM reflection intensity. For example, the lower the amount of black level or color the higher is the intensity of the EM reflection from a particular area (e.g., pixel). For example, for RF radiation reflection the gray scale level data received from the sensor may be converted to Decibel (dB) intensity level at each pixel, using for example, equation 1:

$$I_{dB}=10 \cdot \log(DN^2)-b \qquad (1)$$

wherein, $I_{dB}$ is the converted intensity level in each pixel and DN is the gray scale level in each pixel and b is a constant determined by the type of sensor 150.

As should be understood by those skilled in the art, equation 1 is given as an example only and converting gray scale levels to other intensity levels using different equations are within the scope of the invention.

In some embodiments, EM noise may be filtered from the scan using any known method. The electromagnetic noise may include reflections reflected or bounced from buildings, vegetation or other topographical features located at the scanned area. There are several methods known in the art for filtering EM noise from EM and RF signals and the invention is not limited to a particular method or algorithm.

Some examples for methods for filtering EM noise, from each pixel, according to embodiments of the invention may include reducing noise from buildings using an additional scan (a second scan) taken in the same wavelength but having a different polarization. For example, two RF scans may be conducted, a first scan in a horizontal-horizontal (HH) polarization and a second scan having a horizontal-vertical (HV) polarization. In some embodiments, the electromagnetic noise from solid objects (e.g., buildings) may be defined using the following equations (as with other equations discussed herein, other or different equations may be used) for each pixel:

$$Fd=\tfrac{1}{2}(HH_{dB}^2 - 2 \cdot HV_{dB}^2) \qquad (2)$$

wherein Fd is electromagnetic noise, at a specific pixel, from bouncing reflections from solid objects located in the scanned area, $HH_{dB}$ is the intensity level of HH polarization reflection at the specific pixel, and $HV_{dB}$ is the intensity level of HV polarization reflection at the specific pixel.

In some embodiments, filtering electromagnetic noise may include filtering reflection received from solid objects (Fv) located in the scanned area. The following equations may include examples for using the electromagnetic noise (Fd) and the intensity level of the HH polarization reflection ($HH_{dB}$) for filtering the reflection received from solid objects (Fv).

$$C=(HH_{dB}^2)/(2Fd) \quad (3)$$

$$Fv=2\cdot(\tfrac{1}{2}HH_{dB}^2-Fd\cdot C^2) \quad (4)$$

Wherein C is a parameter calculated using Fd the electromagnetic noise and $HH_{dB}$ the intensity level of HH polarization reflection, and Fv is the calculated electromagnetic reflection noise received from solid objects located in the scanned area.

In some embodiments, reflections from additional polarizations (e.g., VV and VH polarizations) may be used to filter the EM noise. For example, such reflections may be included in an extended equation (2). Various parameters such as Fv and C calculated in equations (2)-(4) may be used to calculate a filtered first scan, according to equation (5).

$$Bs=HH_{dB}-(\text{the } EM \text{ noise}). \quad (5)$$

wherein Bs is filtered EM noise refection received by reduction of the EM noise (e.g., Fv) from the received $HH_{dB}$, which is the intensity level of HH polarization reflection. The calculations conducted in equations (1)-(5) may be conducted to each pixel in the scan. In some embodiments, the raw unfiltered data may include the HH polarization reflections from each pixel and optionally also the HV polarization reflections from each pixel.

In some embodiments, data related to the land cover may be received, for example, from a map of the buildings, roads and vegetation of the area, a topographical map of the area and the like. As used herein "land cover" may include any physical material attached to the surface of the earth, not including, earth, soil, rocks and the like. The land cover may be natural land cover (e.g., vegetation) or manmade (e.g., buildings and roads). In some embodiments, the data related to the land cover may be used to filter EM noise from the scan. In some embodiments, if the scan includes EM reflections in the RF or IR rang, an optical image of the area in the visible light may be used to filter EM noise from the scan.

In step 220, measurements or amounts of at least one physical property taken from known geographical locations (e.g., locations L1 . . . Ln illustrated in FIG. 1) may be received. For example, a user (e.g., a technician) may collect samples, to be analyzed in a laboratory, from specific locations (e.g., specific coordinates) or may measure the physical property on the spot. Accordingly, the measurements of the at least one physical property may be received from at least one of: a sensor measuring the physical property at each geographical location and a sample taken from each geographical location (e.g., coordinates) to be analyzed in a laboratory. In some embodiments, the at least one physical property may be selected from a group consisting of; a level of humidity in the ground at each geographical location, a temperature of the ground at each geographical location, a temperature of the air above the ground at each geographical location, a level of contaminating material in the ground at each geographical location and a level of soil salinity at each geographical location. Other or additional physical properties may be measured.

For example, humidity levels in each location may be measured using a resistance sensor in situ, and/or taken to a laboratory for conducting analysis using an oven draying test. In another example, salinity levels in each location may be measured using laboratory gravimetric analysis. In yet another example, the soil temperature may be measured by directly inserting a thermometer (e.g., a thermocouple) several mm into the soil. Each of the measurements may be associated with the corresponding coordinates of the known geographical location form which the measurement was taken.

In step 230, a first pixel and a second pixel with assumed geographical locations (e.g., coordinates) corresponding to known first and second geographical locations (e.g., coordinates) may be determined or identified in the scan. In some embodiments, controller 110 may receive the geographical coordinates of the geographical locations (e.g., locations L1 . . . Ln illustrated in FIG. 1) at which the physical property measurements were taken. Controller 110 may identify or determine in the scan pixels having a location in the scan that correspond to these geographical coordinates. An example of an identified/determined pixel corresponds to an assumed location is given in FIG. 3. A scan 300 may include a plurality of pixels 310 each corresponds to an assumed location. At least one of the assumed locations A1 (e.g., assumed to be location L1, illustrated in FIG. 1) may be the location of pixel 320 (e.g., the identified pixel) from which it is assumed that a physical measurement was taken. However, due to the EM disturbances in scan 300, the assumed location A1 is incorrect and the correct geographical location (e.g., location L1) appears in pixel 330. A method according to embodiments of the invention may allow to correctly associate a location of each pixel in the scan (such as pixel 330) with real geographical location.

Figure 3:
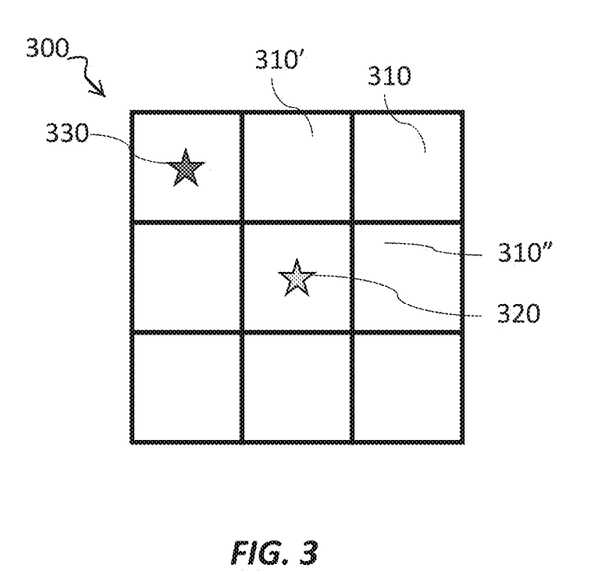
FIG. 3 is an illustration of neighboring pixels in a scan according to some embodiments of the invention.

In step 240, for each identified/determined pixel, a plurality of neighboring pixels may be identified or selected. For example, for identified pixel 320, the illustrated 8 neighboring pixels 310 may be selected. In some embodiments, more than 8 neighboring pixels may be selected. The number of neighboring pixels to be selected is determined according to an expected spatial distortion and/or direct measurements of the locations of objects in the area (e.g., a tree) that may be identified in the scan. As used herein, a neighboring pixel, may be any pixel located at a predetermined close distance from the identified pixel. For example, a neighboring pixel may be any one of the pixels next to the identified pixel, at a distance of one pixel away from the identified pixel, at a distance of two pixels away from the identified pixel and the like. In some embodiments, the predetermined close distance may be determined based on the required accuracy.

Figure 4A:
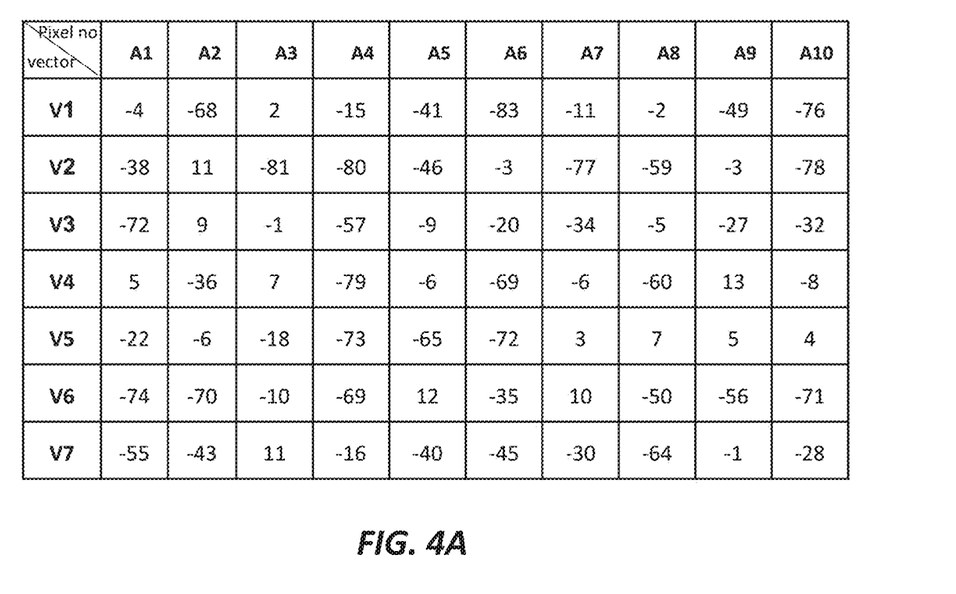
FIG. 4A shows a table that presents pixel values included in pixel vectors according to some embodiments of the invention.
Figure 4B:
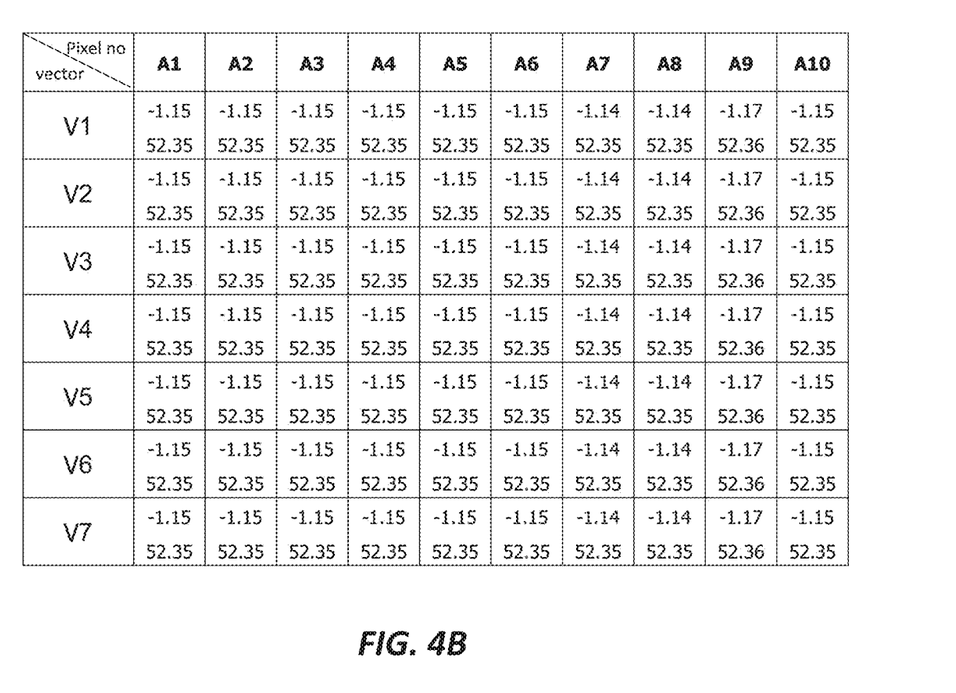
FIG. 4B shows a table that presents the assumed geographical location of each pixel included in FIG. 4A according to some embodiments of the invention.

In step 250, a set of pixel value sets or vectors may be created. In some embodiments, each pixel values vector/set may include a set or an ordered list of pixel values, where each pixel value may be from a neighboring pixel of at least the first pixel and the second pixel. For example, only one of neighboring pixels 310' of identified pixel 320 may be included in a first vector V1 and a different neighboring pixel 310" may be included in a second vector V2. In some embodiments, two pixel values vectors (e.g., sets) may differ in at least one pixel. An example of pixel values vectors (e.g., sets) V1-V7 that includes pixel values associated with 10 different identified pixels is given in FIGS. 4A and 4B. FIG. 4A is a table including the intensity values in dB of pixels included in pixel value vectors V1-V7 for 10 assumed geographic locations A1-A10. Each vector (e.g., set) includes 10 pixel values each related to a neighboring pixel associated with a different identified pixel having different assumed location A1-A10. In some embodiments, each pixel value in each vector may be associated with a specific physical property measurement taken from the known location of its identified pixel (e.g., each known location is associated with an assumed location). FIG. 4B is a table of the corresponding assumed coordinates of the pixel values of FIG. 4A.

In step 260, for each pixel values vector a correlation factor or a comparison parameter may be calculated between the pixel values vector (e.g., set) and a vector or a set that may include the measurements. For example, vector H that includes 10 humidity level measurements (H1-H10) corresponding to the 10 identified pixels associated with assumed locations A1-A10, is shown in the following example:

| H1 | H2 | H3 | H4 | H5 | H6 | H7 | H8 | H9 | H10 |
|---|---|---|---|---|---|---|---|---|---|
| 16% | 42% | 22% | 31% | 16% | 34% | 20% | 36% | 38% | 40% |

In some embodiments, calculating a correspondence, comparison or correlation may include finding a relationship (e.g., leaner relationship) between two vectors: the measurements vector and each pixel values vector. The relationship may be determined using a correlation coefficient, for example, the Pearson correlation coefficient, the Spearman correlation coefficient, the Kendall correlation coefficient and the like.

An example for calculating such a coloration coefficient R is given in equation (6).

$$R^2 = \left(\frac{COV(H, Vn)}{\sigma_{WH} * \sigma_{VN}}\right)^2 \quad (6)$$

wherein, H is the vector of the humidity levels in the known geographical locations (as measured for example, by soil samples taken from the known geographical locations to a laboratory), Vn is the pixel values vector (for example, in dB) and $\sigma_{WH}$ and $\sigma_{Vn}$ are the standard deviations of vectors H and Vn. In some embodiments, n is an integer that may receive the values 1-7 in the example given in FIGS. 4A and 4B. As should be understood by one skilled in the art, equation (6) is given as an example only for calculating a linear correlation between 2 vectors and the invention is not limited to this particular correlation or to linear correlation.

In step 270, a pixel values vector (e.g., $V_i$) may be identified or selected, from the set of pixel values vectors (e.g., V1-V7), for which a correlation factor or a comparison parameter higher than a threshold value was calculated. For example, the threshold value of $R^2$ may be 0.8 and therefore, controller 110 may create a plurality of pixel values vectors, and execute correlation calculations for each vector until a calculated correlation equal to or higher than 0.8 is reached.

In step 280, the actual geographic location (e.g., coordinates) of the area represented by each pixel in the selected/identified pixel values vector or set may be determined based on the known geographic locations. In some embodiments, controller 110 may associate the location of each pixel in the scan, from the selected pixel values vector, with the known geographic locations (e.g., coordinates) of the corresponding measurements in the measurements vector. For example, each known geographic location (L1-Ln) from which the measurements of vector H given above were taken, may be associated with a location (in the scan) of the corresponding pixel in the select vector $V_i$.

Figure 5:
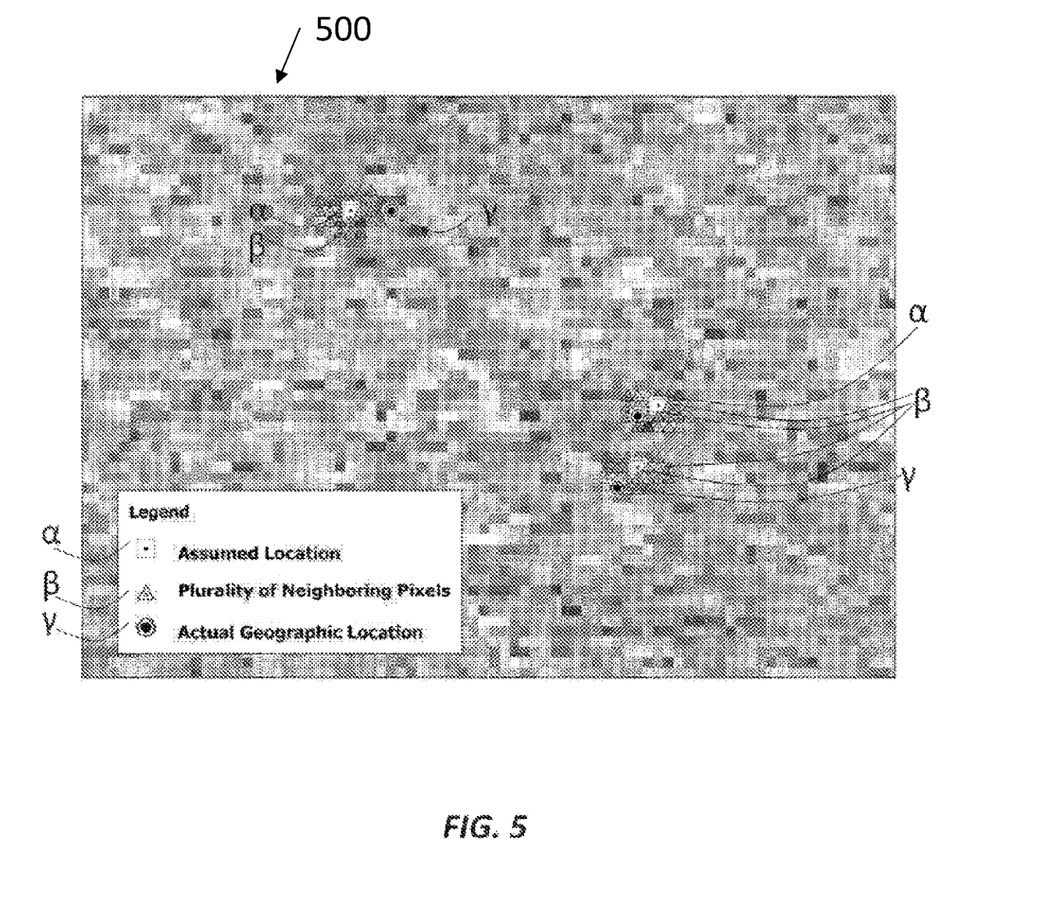
FIG. 5 is an illustration of a scan according to some embodiments of the invention.

An example for graphical representation of such calculations is shown in FIG. 5 which depicts a scan 500 from an area according to some embodiments of the invention. Scan 500 may be received, by controller 110, from sensor 155 (e.g., a SAR sensor) and may include a plurality of pixels each presenting grey scale levels proportional to BS RF radiation intensity levels (e.g., in the L band). Each pixel has a resolution of 3×3 meters. Each location of a pixel in scan 500 is associated with assumed geographical coordinates (e.g., an assumed location) (Step 210). Three humidly level measurements were taken from known geographical coordinates in the area (Step 220). The three known geographical coordinates were associated with 3 assumed locations in scan 500, marked as α (Step 230). A plurality of neighboring pixels marked as β were selected (Step 240). In some embodiments, controller 110 may preform Steps 250-280 in order to determine the actual geographic locations in scan 500, marked as γ from which the humidity measurements were taken.

In some embodiments, following step 280 controller 110 may correct the spatial/geometrical distortions included in the scan, thus allowing for correct correlation between the location of a pixel in the scan and its geographical coordinates in the real world.

In some embodiments, controller 110 may further be configured to generate or create an equation associating pixel values form the selected vector with the physical property values based on the association. For example, a linear equation (or any other mathematical equation) that associates pixel values with humidity levels may be determined based on the pixel values of the selected vector $V_i$ and the measured humidity levels. Such an equation may be used for re-calibrating the intensity levels associated with a physical property and to use the recalibrated intensity levels in forming of accurate maps from a received scan.

In some embodiments, controller 110 may use the create equation associating pixel values with physical property values to recalibrate (mathematically) every new scan received from a new area (e.g., taken by sensors 150 and/or 152). The recalibration of the scan may be used to create a more accurate map of the new area (than a map created using the raw scan) showing the physical property values at each geographical location in the new area.

In some embodiments, the equation may allow to analyze correctly new scans received from remote sensor 150 and/or 152. In some embodiments, controller 110 may be configured to: receive from the remote sensor an additional scan from an area and determine the physical property values at each pixel in the scan based on the created equation. After applying the created equation for each pixel in the new additional scan, controller 110 may display a map of the physical property (e.g., humidity levels, temperatures, etc.) on a display (e.g., screen 132).

A system and a method according to embodiments of the invention may improve prior technology by for example allowing a more accurate detection of physical properties, such as humidity levels and temperatures from a distance. In some embodiments, scans received from remote sensors that may include electromagnetic distortion may be recalibrated and corrected in order to increase their accuracy when compared to prior technology. For example, grey scale pixel values received from a SAR sensor may provide in accurate correlation to the humidity level of the land portion corresponds to the pixel. The inaccuracy may be led to calculating wrong humidity level, for example, 20% instead of 42%.

Conducting the recalibration according to embodiments of the invention may allow to multiply (or conducting any other mathematical manipulation) the wrong calculation with a correction factor that may allow to increase the accuracy of the calculated humidity.

While certain features of the invention have been illustrated and described herein, many modifications, substitutions, changes, and equivalents will now occur to those of ordinary skill in the art. Further, features of some embodiments may be used with other embodiments. It is, therefore, to be understood that the appended claims are intended to cover all such modifications and changes as fall within the true spirit of the invention.

What is claimed is:

1. A system for determining a geographic location corresponding to pixels in a scan of an area, the system comprising:
    a memory; and
    a processor configured to:
        for the scan which comprises a plurality of pixels, wherein each pixel includes a pixel value indicative of an electromagnetic (EM) reflection,
        receive, for known geographical locations, measurements of at least one physical property;
        identify in the scan at least a first pixel and a second pixel with assumed geographical locations corresponding to known at least a first and a second geographical locations;
        create a set of pixel values vectors, wherein each pixel values vector comprises a set of pixel values, and each pixel value is from a neighboring pixel of at least the first pixel and second pixel;
        for each pixel values vector calculate a correlation factor between the pixel values vector and a vector that includes the measurements;
        select a pixel values vector, from the set of pixel values vectors, for which the correlation factor higher than a threshold value was calculated; and
        determine an actual geographic location of an area represented by each pixel in the selected pixel values vector based on the known geographical locations.

2. The system of claim 1, wherein the measurements of the at least one physical property is received from at least one of a sensor measuring the physical property at each geographical location and a sample taken from each geographical location to be analyzed in a laboratory.

3. The system of claim 1, wherein the at least one physical property is selected from a group consisting of: a level of humidity in a ground at each geographical location, a temperature of ground at each geographical location, a temperature of the air above the ground at each geographical location, a level of contaminating material in the ground at each geographical location and a level of a soil salinity at each geographical location.

4. The system of claim 2, wherein the sensor is attached to an object located at least 50 meters above the area.

5. The system of claim 2, wherein the sensor is selected from a group consisting of:
    a sensor for detecting radio frequency radiation reflections and an infrared camera.

6. The system of claim 1, wherein the pixel values received from the scan are grey levels, and the processor is further configured to:
    convert the pixel values from grey levels to intensity levels.

7. The system of claim 1, wherein the processor is further configured to:
    filter a noise from the scan.

8. The system of claim 7, wherein the processor is further configured to:
    receive data related to a land cover; and
    filter the noise from the scan using the data.

9. The system of claim 1, wherein the processor is further configured to:
    associate each pixel value form the selected the pixel values vector with a corresponding physical property measurement; and
    create an equation associating pixel values with physical property values based on the association.

10. A method of determining a geographic coordinate corresponding to pixels in a scan of an area received from a remote sensor, the method comprising:
    for the scan which comprises a plurality of pixels, wherein each pixel includes a pixel value indicative of an electromagnetic (EM) reflection;
    receiving, for known geographical coordinates in the area, measurements of at least one physical property;
    determining in the scan at least a first pixel and a second pixel with assumed geographical coordinates similar to the received known geographical coordinates;
    creating a set of pixel values sets, wherein each pixel values set comprises a set of pixel values, and each pixel value is from a neighboring pixel of at least the first pixel and the second pixel;
    for each pixel values set calculating comparison between the pixel values set and a set that includes the measurements;
    identifying a pixel values set, from the set of pixel values sets, for which a comparison parameter higher than a threshold value was calculated; and
    determining actual geographic coordinates of the area represented by each pixel in the selected pixel values set based on the known geographic geographical coordinates.

* * * * *